April 1, 1930.   A. L. ANDERSON   1,752,473

REDUCING VALVE

Filed June 24, 1927

WITNESSES
Gunnar C. Engstrand
Louis Rypeldt

Inventor
Augustus L. Anderson

Patented Apr. 1, 1930

1,752,473

UNITED STATES PATENT OFFICE

AUGUSTUS L. ANDERSON, OF BROOKLYN, NEW YORK, ASSIGNOR TO PRESTO PRIMER AND REDUCING VALVE CORPORATION, A CORPORATION OF DELAWARE

REDUCING VALVE

Continuation of abandoned application Serial No. 112,890, filed June 1, 1926. This application filed June 24, 1927. Serial No. 201,211.

My invention relates to improvements in pressure reducing and pressure regulating valves, in which a pliable diaphragm supported by a compressed spring serves to operate means for regulating and reducing the pressure of gases entering the valve body. My invention is especially adapted for use in reducing and regulating the pressure of gas from Prest-o-lite tanks, which are commonly used on automobiles and motor boats, in which tanks acetylene or carbide gas is confined under high pressure.

The objects of my invention are to provide a regulating and reducing valve through which the gases are discharged and supplied to an internal combustion engine, or for other uses, at a constant pre-determined pressure from a tank in which the gases are confined under great pressure, that is, in tanks in which the confined gases are under pressures varying from an initial pressure of two hundred and fifty pounds to a few pounds, as the gases in the tank are gradually exhausted; also to provide a pressure reducing valve simple and economical in construction, not liable to get out of order, and whose parts may be cheaply made and easily assembled.

My invention also has for its object to provide a pliable diaphragm made, preferably, either of rubberized canvas, or of phosphor bronze having a thickness of two-one-thousandths of an inch, at which thickness the metal becomes pliable and permits the diaphragm to be bulged back and forth without causing any noticeable internal stress.

The pliable diaphragm, supported by a compressed spring, combined with a special rim locking arrangement for the diaphragm, and the adjustable connecting strut, or screw rod (which is connected to the diaphragm), permits a proper initial adjustment of the diaphragm and an initial inward sag of the diaphragm which is preferable to secure the proper working of the valve mechanism.

The combination of the pliable diaphragm and a supporting adjustable compressed spiral spring permits an adjustment which enables the operator to change and regulate the pressure reduction without taking the valve apart and permits the operator to secure a pre-determined discharge pressure from the valve of from one ounce to thirty pounds per square inch as may be desired for any particular character of work.

In the drawings:—

Figure 2:
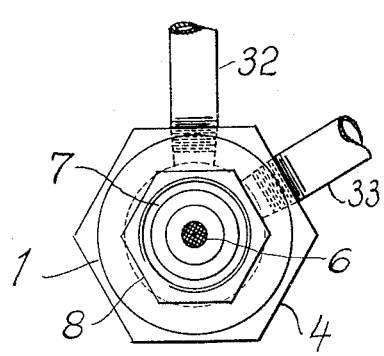
Figure 2 is a full size top view of the reducing valve.
Figure 1:
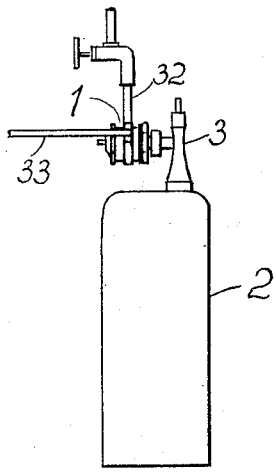
Figure 1 shows the reducing valve mounted on a Prest-o-lite tank.

Referring to the drawing in which like reference characters designate corresponding parts, 1 represents the pressure reducing valve which is attached to the Prest-o-lite tank 2 which is supplied with a valve 3 to which the reducing valve is screwed.

The valve cap 4 is provided with the inlet lug 5 on top of which the strainer 6 is clamped by means of the cap nut 7 around which the swivel nut 8 is free to rotate.

The valve cap 4 locks the disc 9 in position against the valve body 10 and the rim of the pliable diaphragm 11 is clamped between the shoulder inside the valve body and the annular washer or ring 12 by means of the screw end 13.

The sealing disc 9 is provided with the intake nozzle 14 which is provided with the V-shaped annular ridge 15 against which a pliable or compressible seat 16 contacts or abuts when the valve inlet is closed.

The pliable or compressible seat is shown contained in a ferrule 17 which is attached to the lever 18.

The sealing disc is also provided with the double brackets 19 and 20 between which the operating levers operate and are guided.

The connecting screw rod 21 is attached to the lever 22 by means of the pivot pin 23 which passes through the lever, and the screw rod passes through the forked nut 24 which nut is screwed onto the end of the connecting rod.

The connecting rod 21 is provided with the screw cap 25 and the pliable diaphragm is clamped at its center between the screw cap 25 and the shoulder 26 with which the connecting rod is provided.

A spiral spring 27 is placed around the screw cap 25 and abuts against the shoulder 28 with which the cap is provided.

The spiral spring is made sufficiently long so as to firmly press against the bottom of the cup 29 which is held in position by the screw 30 around the end of which the cup is free to rotate.

At a convenient place the air equalizing hole 31 is provided.

The action of the valve is as follows:—

The reducing valve 1 is attached to the valve 3 on the Prest-o-lite tank 2 and when this valve is opened the carbide gas in the tank will enter the reducing valve through the strainer 6 and the nozzle 14.

The pressure in the valve chamber will then cause the pliable and sagging diaphragm to bulge outwards and compress the spring 27.

The pliable diaphragm which is at its center attached to the screw connecting rod 21 will, in bulging outwards, cause the short arm of the lever 22 to press against the lever 18 and the pliable or fiber seat 16 will contact or abut against the V-shaped ridge 15 and thus close the nozzle 14.

As the gas in the valve escapes through the outlets 32 and 33 and is consumed the pressure inside the valve is reduced and the spring pressure will bulge the sagging diaphragm inwards and cause the lever 22 to recede from the lever 18 which will then be forced outwards by the tank pressure and the flow of gas will be maintained at the pre-determined reduced pressure.

It is readily understood that the V-shaped ridge around the nozzle materially increases the surface acted upon by the tank pressure and its power to lift the seat from the nozzle is therefore materially increased, and the combination of a flat seat on a diverging or countersunk inlet nozzle is a part of my invention.

In order to obtain a tight and lasting seal of the nozzle I have found it necessary to employ a pliable or fiber seat and my preferred construction has such a seat encased in a ferrule piece which is attached to the lever 18.

Figure 3:
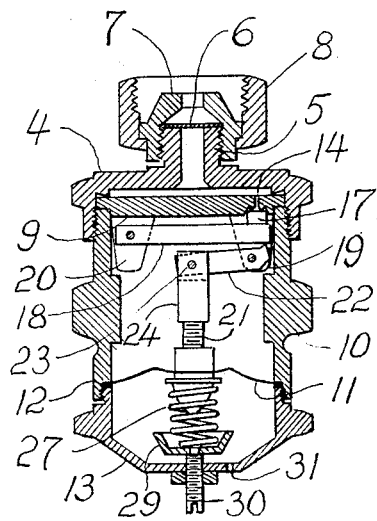
Figure 3 is a full size longitudinal section through the reducing valve and shows the valve in a closed position.
Figure 4:
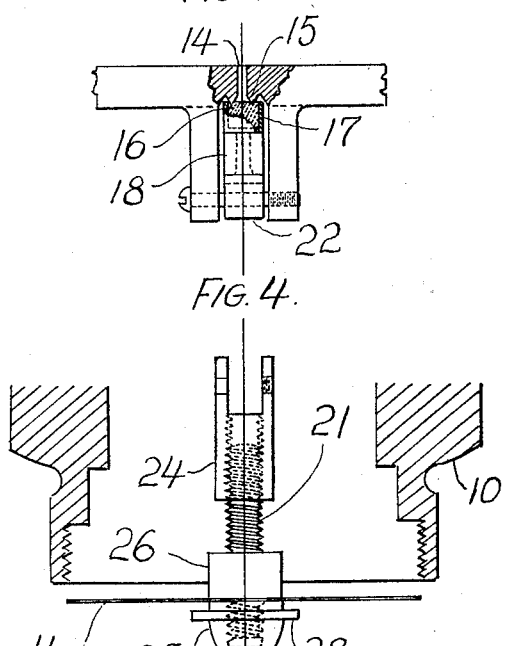
Figures 4 and 5 show the detail construction of the valve nozzle and also the diaphragm arrangement all in an enlarged scale.
Figure 5:
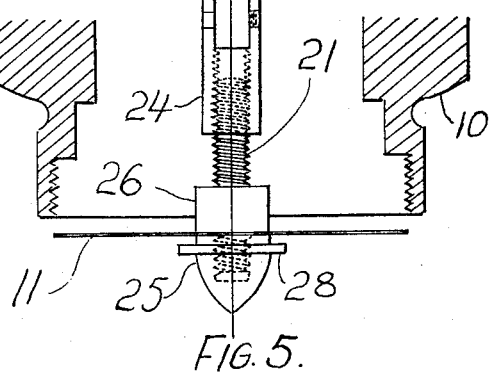

The pliable diaphragm when pressed in position against the shoulder in the valve body will bulge as shown in Figure 3 when the connecting screw rod is screwed into the forked nut 24 and a proper sag can be readily obtained by turning the attached diaphragm a certain number of turns before clamping the diaphragm in place by means of the screw end 13.

It is to be noted that the diaphragm is pliable without being stretchable and it is possible to obtain a considerable working range for the valve operating levers by means of setting up an initial sag in the diaphragm before clamping it in position. This arrangement makes it possible to use levers of high leverage and to obtain a very sensitive reducing valve.

It is also to be noted that my preferred valve can be successfully employed where steady discharge pressures of from one ounce to 30 pounds per square inch is desired. It is also to be noted that the present conventional reducing valves can not be used where a discharge pressure of one pound per square inch or less is desired.

I do not wish to be understood as limiting myself to the specific details of construction as it is manifest that variations and modifications may be made in the device without departing from the spirit of my invention.

It is obvious that the sealing disc may be dispensed with and an intake nozzle be installed in the valve cap without departing from my invention. However, I prefer to use the sealing disc as the space between the sealing disc and the valve cap serves to assist in reducing the gas pressure.

This application is a continuation of my abandoned application filed June 1st, 1926, Serial No. 112,890.

I claim:—

1. A reducing valve comprising a cylindrical casing and screw caps at opposite ends of the casing, a diaphragm extending across said casing and secured in position by one of said caps, a disk secured in position by the other cap and forming the interior of the casing into two chambers, said disk having an opening forming an inlet nozzle extending from one chamber to the other; a closure for said nozzle, levers mounted on said disk for operating said closure and a detachable connection between said levers and diaphragm.

2. A reducing valve comprising a cylindrical casing, a diaphragm mounted in and extended across said casing, a screw cap closing one end of said casing, a disk secured in said casing by said cap and formed with an intake nozzle, a closure for said nozzle and operating means therefor mounted on said disk, and a screw threaded connection between said operating means and the center of said disk whereby said disk and operating means may be removed from said casing on rotation of said disk without removing said diaphragm.

3. In a pressure reducing valve, a circular disk formed near its periphery with a pair of supporting lugs and a second pair of similar lugs diametrically opposite to said first named pair and said disk between the lugs of one pair being formed with a perforation constituting an inlet nozzle.

4. In a reducing valve of the character described, a casing, an intake nozzle in said casing at one side thereof, a lever pivotally mounted at the opposite side of said casing, and extending across said casing, a closure for said nozzle rigidly secured to the outer end of said lever, a pair of supporting brackets at opposite sides of said nozzle, said brackets engaging and serving as a guide for the outer end of said lever, and a second lever mounted in said brackets and formed between said brackets with a cam surface adapted to engage said first named lever to force said closure against said nozzle.

5. In a reducing valve of the character described, a casing, a disk mounted in and extending across said casing and formed near its edge with a perforation forming an intake nozzle, a lever pivotally mounted on said disk at a point opposite to said nozzle, a closure for said nozzle rigidly secured to the outer end of said lever, a pair of supporting brackets adjacent to and at opposite sides of said nozzle, said brackets engaging and serving as a guide for the outer end of said lever, and a second lever mounted in said brackets with a cam surface adapted to engage said first named lever to force said closure against said nozzle.

AUGUSTUS L. ANDERSON.